Oct. 31, 1933.                J. V. DYRR                  1,932,450
           ADJUSTABLE DEPTH GROUND WORKING IMPLEMENT
                  Filed Sept. 3, 1929         2 Sheets-Sheet 2
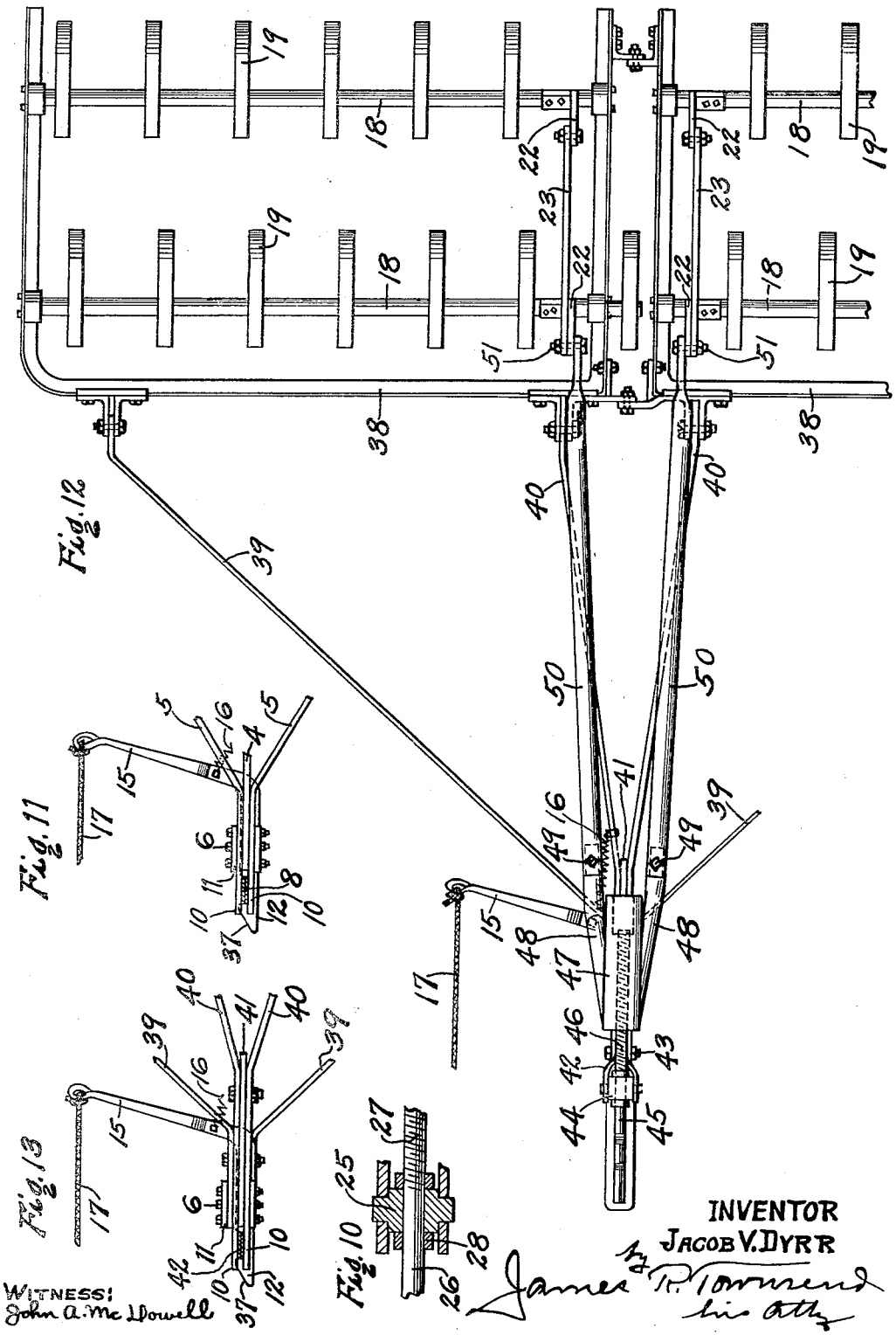
INVENTOR
JACOB V. DYRR Patented Oct. 31, 1933

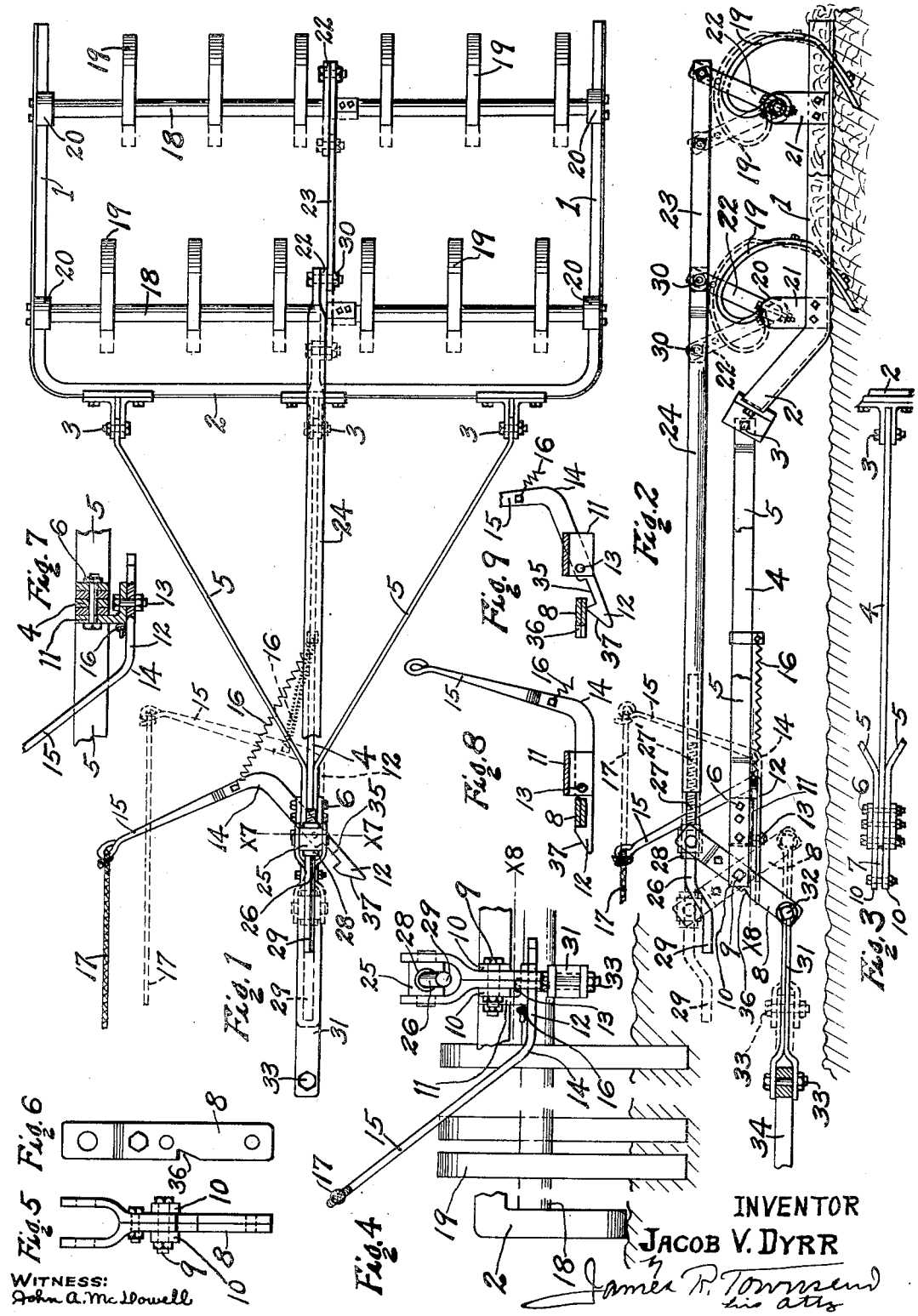

1,932,450

UNITED STATES PATENT OFFICE 1,932,450

ADJUSTABLE DEPTH GROUND WORKING IMPLEMENT

Jacob V. Dyrr, Bell, Calif.

Application September 3, 1929
Serial No. 390,034

3 Claims. (Cl. 55—104)

This invention relates to that class of implements in which ground working tools are connected to a ground supported travelling frame or carriage, and do not ride on the ground, but are adjustable to different heights to travel over the ground or to stir the ground to a predetermined depth; and an object of the invention is to provide an implement of the character referred to in which the tractive power is directly applied to insert the tools into and draw them through the ground, to directly draw the tools out of the ground, and to directly draw the tool carrier when the tools are out of the ground.

This invention is best exemplified in connection with harrows and will herein be described as applied to harrow construction and operation especially as embodied in a spring tooth harrow having runners that support a frame on which one or more shafts are journalled for holding the harrow teeth in or out of the ground for stirring the same, or for moving the implement from place to place without stirring the ground.

An object of the invention is to provide novel means to apply the power that draws the implement, directly to insert the teeth into the ground or to lift them from the ground and to hold them free from the gorund as, and when, desired.

A feature of the invention is a shifting power applying device comprising a lever, a rigid draft bar, two rigid relatively reciprocating draw bars pivotally connected to the lever, and a latch therefor whereby the power from a tractor and the gravity of the carrying frame may be applied as desired to insert the tools into, and to hold them in the ground or to apply the power to draw the carrier with tools, out of the ground; and I make provision for readily shifting from tool draft to carriage draft by power of the tractor so that manual effort is minimized.

An advantage of this invention is that heavy ground working tools may be handled with comparatively little effort on the part of the operator.

A feature of the invention is a power shifting device comprising a lever and a latch therefor and connections whereby the power from a tractor may be applied as desired to directly draw the tool, thereby drawing the carriage or to directly draw the tool carrier with the tools; and I make provision for readily shifting from tool draft to carriage draft by power of the tractor.

In this invention I provide for the application of power from the tractor through pivotally mounted rigid rods or bars to lift the teeth out of the ground by backing the tractor; and then by means of an automatic latch, connecting the parts so that forward movement of the tractor will draw the tooth carrying carriage over the ground, and make provision whereby the latch can be released so that the power of the tractor will return the teeth to the ground.

Other objects are ease of manufacture, assembly and disassembly for repair.

Heretofore it has been deemed necessary to provide ground working implements with traction wheels by which the ground working tools are moved into and out of the ground by power from such traction wheels and this invention comprises a wheelless ground working implement in which the tools are shiftable into and out of the ground by the power that draws the implement.

It is understood that the invention is applicable in a harrow having straight rigid teeth fixed to a shaft journalled on a flat frame and oscillatable by a lever; but illustration of the device as applied with spring harrow teeth will be sufficient for a full understanding of such form by one skilled in the art.

Other objects, advantages and features of invention may appear from the accompanying drawings, the subjoined detailed description and the appended claims.

The accompanying drawings illustrate the invention.

Figure 1 is a plan view of a spring tooth harrow having two harrow tooth shafts journalled on a sled runner type of carriage with parts in position in solid lines for inserting the teeth into and drawing them along in the earth; a portion of the tooth draw bar is broken away to expose the carriage draw bar below it; the working position of parts is shown in solid, and the traveling position is shown in broken, lines.

Fig. 2 is a side elevation with parts in solid and broken line positions analogous to those shown in Fig. 1.

Fig. 3 is a view of the carriage draw bar, the side braces being broken to contract the view.

Fig. 4 is a fragmental elevation from the front of Figs. 1 and 2, omitting the dotted line position.

Fig. 5 is a front elevation of the draw bar connecting lever with fulcrum assembly but omitting the trunnion block.

Fig. 6 is a side elevation of the draw bar lever.

Fig. 7 is a vertical section on line x7, Fig. 1.

Fig. 8 is a plan view of the latch and its support, a fragment of its spring and a section of the draw bar connecting lever on a horizontal plane indicated by line x8, Figs. 2 and 4, the latch being shown engaging the lever which pivotally connects the carriage draw bar, the tool draw bar and the draft bar; the latch handle being shown in plan and in slanting elevation, and the latch being adjusted to apply the power directly to the tool, to pull it through the ground.

Fig. 9 is a view analogous to Fig. 8 showing the released position of the latch and lever.

Fig. 10 is a detail of the trunnion connection between the harrow tooth draw bar and the draw bar lever.

Fig. 11 is a detail of parts at the front end of the carriage draw bar, the latch being shown in place latching the lever which is shown in section on the plane of the upper edge of the carriage draw bar.

Fig. 12 is a fragmental plan of a duplex harrow.

Fig. 13 is a fragmental detail of an implement of the character shown in Fig. 12 illustrating the construction for the draw bar of the duplex harrow carriage.

In Fig. 1 the tool carriage comprises the sled runners 1 connected at their front by a cross bar 2 to which is jointed on a horizontal axis by bolts 3, the rigid carriage draw bar shown as comprising a central member 4 and two brace members 5 which members are secured together at the front by bolts 6, the central bar terminating rearwardly of the front ends of the brace members 5 which are spaced apart as at 7 to accommodate between them a latch controlled draft lever 8 that is fulcrumed by a horizontal pivot bolt 9 to the carriage draw bar between parallel front projections 10 of the front ends of the brace members 5.

11 is a latch supporting bracket extending underneath the plane of the carriage draw bar and fixed to one side of said draw bar by the bolts 6. 12 is the draft lever controlling latch pivoted by a pivot 13 to the bracket 11 and connected by a bend 14 to a handle 15 which extends upwardly rearwardly and laterally aslant and is yieldingly held back by a spring 16 to normally hold the latch in tool drafting position, as indicated in Fig. 8, from which position the latch will be released when the upper end of the lever is drawn forward by a line 17 under the control of the driver of the propelling power such as a tractor not shown, so as to release the draft lever 8 as indicated in Fig. 9, so that the teeth will enter the ground and stir it to the depth predetermined by the depth adjustment of the parts.

18 indicates oscillatory tool shafts provided with harrow teeth 19 that are rigid to their respective shafts which are journalled by bearings 20 that are fixed to the runner 1 by standards 21; and said shafts are provided with operating arms 22 to which is pivotally connected a connecting rod 23 that is longitudinally operable by a rigid longitudinally oscillatable tool or harrow tooth draw bar 24 which is pivotally connected to the upper limb of the draft lever 8 by a suitable trunnion block 25, through which extends a section 26 of the tool rod or draw bar 24 that is provided with a threaded portion 27 which is telescopically screwed into a threaded seat or socket 27' in the end of the tubular tool draw bar or rod 24 that is preferably a pipe having said internally threaded portion 27'.

Said section 26 is provided with a collar 28 that abuts against the trunnion, and said section 26 is provided with a crank 29 by which it may be turned to screw the section 26 into the socket to take up the space between the collar 28 and the joint 30 at the end of the operating arm 22 of the front harrow tooth shaft 18, thus to adjust the depth at which the tools will work.

31 is a rigid draft bar pivotally connected by the pin 32 to the lower end of the lever 8 and pivotally connected at its lower end 33 to the tractor bar 34 which is drawn by a tractor of any character, not shown.

The latch 12 is shown provided with a notch 35 to accommodate the draft lever 8 that is provided with a notch 36 in which the keeper of the latch engages; the tips 37 of said latch being beveled so that when the lower or power end of the draft lever 8 is shoved back as by backing the tractor from the pulling position indicated by the solid lines in Fig. 2, the latch 12 will be fully drawn into latching position by the spring 16 to engage and hold the draw bar lever in the position indicated in broken lines in Fig. 2 so that forward movement of the tractor and its bar 34 will draw the draft bar 31 and the carriage along with the tools out of the ground as indicated in broken lines in Fig. 2.

In the form shown in Fig. 12 there are companion carriage frames 38, each connected by a pair of lateral braces 39, 40, to one side of a stub bar 41 to which the carriage and tool draw bar connecting lever 42 is pivoted by pivot 43; said draft lever being provided at its top with the trunnion 44 through which extends the tool adjusting crank rod 45 having a screw threaded section 46 screwed into a hub 47 having extensions 48 connected by bolts 49 with the harrow tooth draw bars 50 that are pivoted by bolts 51 to the arms 22 of the harrow tooth or tool shafts 18.

The operating arms 22 of the front and the rear harrow tooth shafts 18 are connected together by rigid connecting rods 23.

The operation of the apparatus in either of its forms is readily understood from the foregoing. When the latch is released as shown in Figs. 1 and 2, the forward movement of the tractor and its bar 34 draws the lower end of the bar adjusting lever 8 forward and throws the upper end of the draft lever back, thus inserting the tools or harrow tooth points into the earth, and thus making the harrow work the soil as the tractor advances. When it is desired to lift the teeth out of the earth the tractor will be backed, thus operating through the rigid bars 31, 4, and 24 to move teeth 19 into the broken line position shown in Fig. 2; and thereupon the lower limb of the draft lever will be caught by the latch 12 that is operated by the latch spring into the position shown in Fig. 8. Then forward movement of the tractor will draw the carriage forward while the teeth are upheld in the broken line position.

If it is desired to cause the teeth to work deeper or not so deep, the crank 29 will be turned in the desired direction to effect the appropriate adjustment.

I claim:—

1. In an implement of the character set forth, comprising ground working tools; a carriage for such tools; a tractor operated draft bar; a draw bar for the carriage; a draw bar for oscillating the tools on the carriage; a power shifting device comprising a draft lever pivoted to the draft bar and the draw bars and a latch therefor whereby the power from the draft bar may be applied as desired to alternately directly draw the tools, or to directly draw the tool carriage for ready shifting from tool draft to carriage draft by power of the tractor; said latch being controlled by a lever that is a laterally and upwardly extending portion of the latch.

2. The combination with a carrying frame of a tool shaft journalled on the frame; and provided with tools and an oscillating arm fixed to the shaft; a draw bar connected to the carriage; a reciprocating draw bar connected to the oscillatory arm; a draft lever fulcrumed to the carriage draw bar and pivoted to said reciprocating draw bar; a draft bar pivoted to the lever; and draft latch means connected to the carriage draw bar and releasable by the operator, and adapted to hold the draft lever in tool retracting position.

3. The combination with a carrying frame, of a tool shaft journalled to the frame; harrow teeth fixed to the shaft; a carriage draw bar fixed to the carrying frame at one end and at whose other end is fulcrumed a draft lever; said draft lever being provided at its upper end with a U shaped opening and below its fulcrum with a notch; a crank provided with a threaded section; a rigid tubular bar having one end connected to operating arms which are pivotally connected by a connecting rod to oscillate the shaft and at the other end a threaded bore into which is screwed said crank section that is mounted in a trunnion that pivots in the U shaped opening of said draft lever; a latch supporting bracket extending underneath the plane of said carriage draw bar and fixed to one side of the bar; a draft lever controlling latch provided with a handle which extends upwardly rearwardly and laterally aslant which is pivoted to said latch supporting bracket and that is yieldingly held back by a spring one end of which is fixed to said carriage draw bar; said controlling latch being provided with a notch to accommodate the draft lever notch which the keeper of said latch engages and a rigid draft bar connected to the lower end of said draft lever to oscillate it relative to raising and lowering of the tools and forward movement of the tractor.

JACOB V. DYRR.